2,829,150
4-HYDROXYPREGNENES

Frank B. Colton, Chicago, Ill., assignor to G. D. Searle & Co., Chicago, Ill., a corporation of Illinois No Drawing. Application December 12, 1955
Serial No. 552,274

8 Claims. (Cl. 260—397.45)

The present invention relates to a new group of steroids and, specifically, to 4,21-dihydroxypregnene-3,20-diones, their 11-oxygenated and 17-oxygenated derivatives, and esters thereof. The compounds which constitute this invention can be represented by the general structural formulas

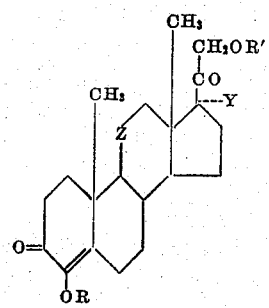

and

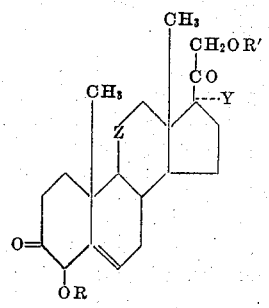

wherein R and R' are members of the class consisting of hydrogen and acyl radicals of lower hydrocarbon carboxylic acids, Y is a member of the class consisting of hydrogen and hydroxyl, and Z is a member of the class consisting of methylene ($CH_2$), carbinol (CHOH), and carbonyl (CO) groups. The terms R and R' can represent hydrogen and such acyl radicals as formyl, acetyl, propionyl, butyryl, valeryl, hexanoyl, heptanoyl and octanoyl, and branched-chain isomers thereof, said acyl radicals being lower alkanoyl radicals derived from alkanoic acids having fewer than 9 carbon atoms. R and R' can also represent cyclic acyl radicals such as cyclopentanepropionyl, cyclohexaneacetyl, benzoyl and toluyl.

Suitable starting materials for the manufacture of the compounds of this invention are described in my copending applications Serial No. 440,269, now U. S. Patent No. 2,782,213, filed June 29, 1954, and Serial No. 451,313, now U. S. Patent No. 2,727,912, filed August 20, 1954, of which applications this is a continuation-in-part.

The compounds of this invention are conveniently prepared by subjecting a 4-acyloxy-5-hydroxypregnane derivative or a 4,5-dihydroxypregnane derivative to the action of a dehydrating agent. Depending on the specific reagent and reaction conditions employed, introduction of the double bond into either the 4,5- or the 5,6-position can be favored. For example, heating a 4-acyloxy-5-hydroxypregnane derivative corresponding to the general structural formula

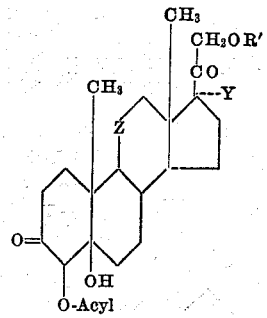

with p-toluenesulfonic acid in glacial acetic acid or with a mixture of a lower alkanol and a mineral acid, representatively methanol and concentrated hydrochloric acid, results in the formation of a reaction product having a 4,5-double bond. The product formed in this reaction is principally the 4-hydroxy derivative corresponding to the general structural formula

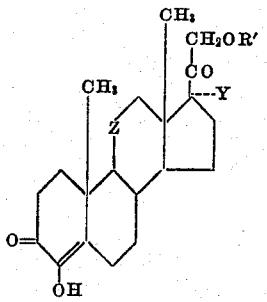

The same product is obtained by treatment of a 4,5-dihydroxypregnane derivative under identical conditions.

When a 4-acyloxy-5-hydroxypregnane derivative of the class employed as starting materials for the manufacture of the compounds of this invention is dehydrated with thionyl chloride and anhydrous pyridine at about 0° C., entry of the double bond into the 5,6-position is facilitated, and the principal product is a 4-acyloxy-5-pregnene derivative corresponding to the general structural formula

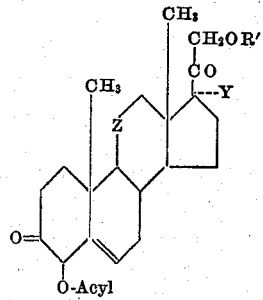

This method of dehydration is especially recommended for those compounds, such as 11β-hydroxy and 17-hydroxy derivatives, which can readily undergo other dehydration reactions under more vigorous conditions. Treatment of a 5-pregnene derivative of this type in acetic acid solution with hydrochloric acid at room temperature for 5–30 minutes results in isomerization to the corresponding 4-pregnene derivative. In all of these structural formulas R', Y, and Z are defined as hereinbefore.

Application of the thionyl chloride dehydration procedure to a 4,5-dihydroxypregnane derivative yields the 4-hydroxy-5-pregnene, which is isomerized to the 4-hydroxy-4-pregnene by treatment with mineral acid.

Preferred starting materials for use in the processes of this invention include the following polyhydroxy compounds and their 4,21-di-(lower)alkanoates: 4,5,21-trihydroxypregnane - 3,20 - dione, 4,5,11β,21 - tetrahydroxypregnane - 3,20 - dione, 4,5,17α,21 - tetrahydroxypregnane - 3,20 - dione, 4,5,11β,17α,21 - pentahydroxypregnane - 3,20 - dione, 4,5,21 - trihydroxypregnane-3,11,20 - trione, and 4,5,17α,21 - tetrahydroxypregnane-3,11,20-trione.

Treatment of the esters of this invention with a hydrolysis medium such as refluxing aqueous methanol and hydrochloric acid yields polyhydroxy compounds of the general formula

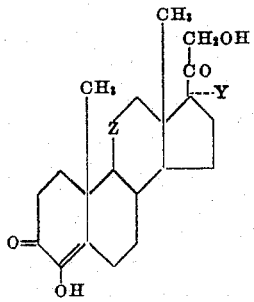

When a 4,21-dihydroxy derivative, a 4,11β,21-trihydroxy derivative, a 4,17α,21-trihydroxy derivative, or a 4,11β, 17α,21 - tetrahydroxy derivative corresponding to this structural formula is subjected to reaction with an acylating agent such as a lower alkanoic acid anhydride in pyridine solution, esterification occurs preferentially with hydroxyl groups at the 4- and 21-positions. If an 11α-hydroxyl group is substituted for an 11β-hydroxyl group, esterification at this position is facilitated.

The compounds of the present invention have valuable pharmacological properties. Specifically, they are potent hypotensive agents. They also exhibit selective hormonal and anti-hormonal properties, being, for example, effective in inhibiting the sodium retention caused by desoxycorticosterone and its esters.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

To a solution of 2 parts of 4,21-diacetoxy-5-hydroxypregnane-3,20-dione in 210 parts of glacial acetic acid is added 1 part of p-toluenesulfonic acid, and the reaction mixture is heated for 19 hours at 70° C. Then ice is added and the precipitate is collected on a filter, washed with water and taken up in ethyl acetate. After charcoal decolorization the ethyl acetate solution is evaporated and the residue is treated with low boiling petroleum ether. Recrystallized from aqueous methanol, the 4-hydroxy - 11 - desoxycorticosterone acetate (4-hydroxy - 21 - acetoxy - 4 - pregnene-3,20-dione) obtained melts at about 241–242° C. The ultraviolet absorption spectrum shows a maximum at 278 millimicrons with a molecular extinction coefficient of 12,300.

Example 2

A stirred suspension of 1 part of 4,21-diacetoxy-5-hydroxypregnane-3,20-dione, 6.3 parts of methanol and 18 parts of concentrated hydrochloric acid is heated under reflux for 5 minutes. The reaction mixture is diluted with a total of 40 parts of water added in small portions, and is then cooled to about 0° C. The precipitated product is collected on a filter and washed with water. Purification by repeated recrystallization from methanol affords 4,21-dihydroxy-4-pregnene-3,20-dione melting at about 210–214° C. This compound has the structural formula

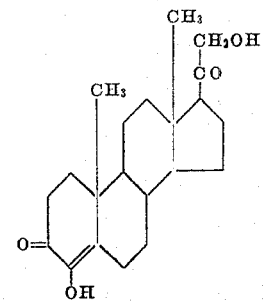

Example 3

A reaction mixture prepared from 1 part of 4,21-dihydroxy - 4 - pregnene-3,20-dione, 4 parts of pyridine and 4 parts of acetic anhydride is allowed to stand, with occasional shaking, for 90 minutes at about 25° C. The mixture is diluted with ice water, and when precipitation of the product is complete, it is collected on a filter and washed with water. Purification by recrystallization from aqueous methanol and then from a mixture of ethyl acetate and petroleum ether yields 4,21-diacetoxy-4-pregnene-3,20-dione finally melting at about 197–199° C. after prior fusion and resolidification at about 180° C. This compound has a specific rotation of +168° in chloroform solution and an ultraviolet absorption maximum at 245.5 millimicrons with a molecular extinction coefficient of 15,900.

Example 4

Concentrated hydrochloric acid (60 parts) is added to a solution of 3 parts of 4,21-diacetoxy-5-hydroxypregnane-3,20-dione in 20 parts of warm methanol, and the reaction mixture is heated under reflux for 8 minutes. It is gradually diluted with several times its volume of hot water, and then cooled to about 0° C. The precipitated product is collected on a filter, washed with water and dried. A solution of this crude product, 8 parts of pyridine and 8 parts of acetic anhydride is allowed to stand at about 25° C. for 4 hours. Ice water is added, and when precipitation of the product is complete, it is collected on a filter and washed with water. Purification by recrystallization from mixtures of ethyl acetate and cyclohexane or from mixtures of ethyl acetate and petroleum ether affords 4,21-diacetoxy-4-pregnene-3,20-dione, identical with the product of Example 3.

Example 5

A reaction mixture prepared from 2.5 parts of 4,21-dihydroxy-4-pregnene-3,20-dione, 12 parts of pyridine and 10 parts of propionic anhydride is allowed to stand for 20 hours at about 25° C. The mixture is diluted with ice water and maintained at about 0–10° C. for an additional 4 hours. The precipitated product is then collected on a filter and washed with water. This product is 4,21-dipropionoxy-4-pregnene-3,20-dione.

Example 6

By the procedure of Example 5, with the substitution of 4-hydroxy-21-acetoxy-4-pregnene-3,20-dione for the 4,21-dihydroxy-4-pregnene-3,20-dione, there is obtained 4-propionoxy-21-acetoxy-4-pregnene-3,20-dione.

Example 7

A mixture of 2 parts of 4,21-dihydroxy-4-pregnene-3,20-dione, 15 parts of 98% formic acid and 0.1 part of p-toluenesulfonic acid is allowed to stand, with occasional shaking, for 2 hours at about 25° C. The mixture is diluted with ice water and, when precipitation of the product is complete, it is collected on a filter and washed with water. This compound is 4,21-diformyloxy-4-pregnene-3,20-dione.

Example 8

A mixture of 4 parts of 4,21-dihydroxy-4-pregnene-3,20-dione, 30 parts of pyridine and 15 parts of butyric anhydride is heated at 90–100° C. for 90 minutes and then allowed to stand for 20 hours at about 25° C. The mixture is diluted with ice water and refrigerated. When precipitation of the product is complete, it is collected on a filter and washed with water. This compound is 4,21-dibutyroxy-4-pregnene-3,20-dione.

Example 9

To a solution of 23 parts of 4,21-diacetoxy-5-hydroxypregnane-3,20-dione in 300 parts of anhydrous pyridine is gradually added a total of 82 parts of thionyl chloride. The reaction mixture is maintained at 0° C. for an additional 6 minutes, and is then poured into a solution of sodium bicarbonate in ice water. This mixture is extracted with ethyl acetate. The organic phase is washed with dilute hydrochloric acid and with several portions of water, dried, and concentrated under reduced pressure. The residue is recrystallized from a mixture of ethyl acetate and cyclohexane and then from a mixture of acetone and petroleum ether to yield 4,21-diacetoxy-5-pregnene-3,20-dione containing only a small amount of the Δ⁴ isomer and melting at about 171–174° C. It shows little selective absorption in the ultraviolet at 245 millimicrons. A sample placed on a preheated block exhibits the irregularities in melting point characteristic of a solvated material. This compound has the structural formula

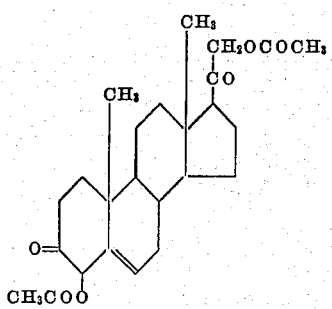

Example 10

A solution of 10 parts of 4,21-diacetoxy-5,17α-dihydroxypregnane-3,11,20-trione in 200 parts of anhydrous pyridine is cooled to about 0° C. and treated by the gradual addition of 40 parts of thionyl chloride. The reaction mixture is maintained at about 0° C. for 5 minutes and then poured into a solution of sodium bicarbonate in ice water. The mixture is extracted with ethyl acetate, and the organic phase is washed with dilute hydrochloric acid and with several portions of water. It is then dried and concentrated in a nitrogen atmosphere. Purification of the residue by repeated crystallization from mixtures of ethyl acetate and cyclohexane affords a material, melting point about 219–224° C., which has little selective absorption in the ultraviolet and is substantially 4,21-diacetoxy-17α-hydroxy-5-pregnene-3,11,20-trione, with only a small amount of the Δ⁴ isomer. The structural formula is

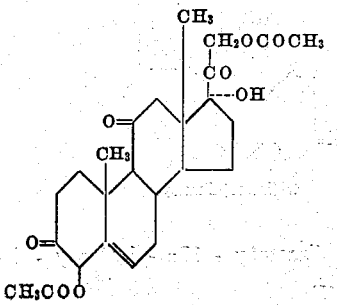

Example 11

A solution of 12.5 parts of 4,21-diacetoxy-17α-hydroxy-5-pregnene-3,11,20-trione, 160 parts of acetic acid and 18 parts of concentrated hydrochloric acid is allowed to stand for 5 minutes at about 25° C. Ice water is then added, and when precipitation of the product is complete it is collected on a filter and washed with water. Successive crystallizations from aqueous acetone, from a mixture of ethyl acetate and petroleum ether, from a mixture of ethyl acetate and cyclohexane, and again from aqueous acetone afford 4,21-diacetoxy-17α-hydroxy-4-pregnene-3,11,20-trione melting at about 231–233° C. This compound has the structural formula

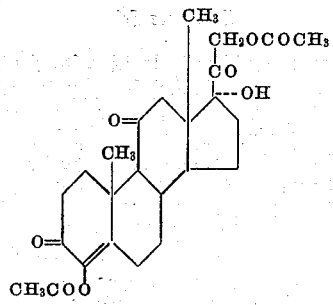

Example 12

A solution of 3 parts of 4,21-diacetoxy-5,11β,17α-trihydroxypregnane-3,20-dione in 100 parts of anhydrous pyridine is cooled to about 0° C. and treated by the addition, in small portions, of a total of 20 parts of thionyl chloride. The reaction mixture is maintained at about 0° C. for 5 minutes and then poured into aqueous sodium bicarbonate. This mixture is rapidly extracted with ethyl acetate, and the organic phase is washed with dilute hydrochloric acid and with several portions of water. It is then dried and concentrated in a nitrogen atmosphere. Purification of the residue by repeated crystallization from mixtures of ethyl acetate and cyclohexane or by chromatography on a silica gel column affords a product which has little selective absorption in the ultraviolet and is substantially 4,21-diacetoxy-11β,17α-dihydroxy-5-pregnene-3,20-dione, containing only a small amount of the Δ⁴ isomer. The structural formula is

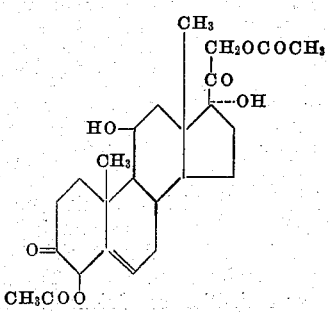

Example 13

A solution of 4 parts of 4,21-diacetoxy-11β,17α-dihydroxy-5-pregnene-3,20-dione, 105 parts of acetic acid and 12 parts of concentrated hydrochloric acid is allowed to stand for 5 minutes at about 25° C. Ice water is then added, and when preciptation of the product is complete it is collected on a filter and washed with water. Purification by successive crystallization from aqueous methanol and from a mixture of ethyl acetate and petroleum ether affords 4,21-diacetoxy-11β,17α-dihydroxy-4-pregnene-3,20-dione. This compound exhibits selective absorption in the ultraviolet at about 245 millimicrons with a molecular extinction coefficient of about 12,500. The structural formula is

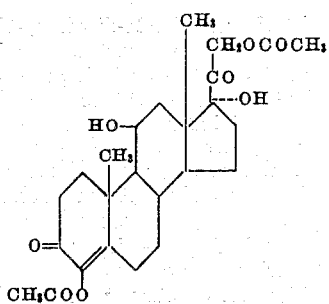

*Example 14*

By the procedure of Example 12, with the substitution of 4,21 - diacetoxy-5,17α-dihydroxypregnane-3,20-dione for the 4,21-diacetoxy-5,11β,17α-trihydroxypregnane-3,20-dione, there is obtained a product which is substantially 4,21-diacetoxy-17α-hydroxy-5-pregnene-3,20-dione of the structural formula

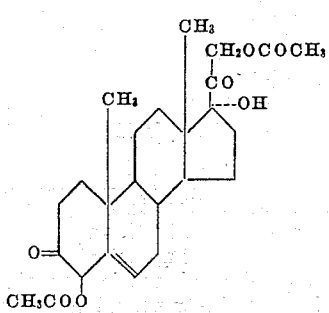

This compound has little selective absorption in the ultraviolet. By treatment with acetic acid and concentrated hydrochloric acid according to the procedure of Example 13, it is isomerized to 4,21-diacetoxy-17α-hydroxy-4-pregnene-3,20-dione. This isomer has an ultraviolet absorption maximum at about 245 millimicrons with a molecular extinction coefficient of about 12,500.

*Example 15*

One part of 4,21-diacetoxy-11β,17α-dihydroxy-4-pregnene-3,20-dione is dissolved in 40 parts of methanol. Water (10 parts) and concentrated hydrochloric acid (2 parts) are added and the reaction mixture is heated under reflux for 30 minutes. The cooled reaction mixture is diluted with water and refrigerated until separation of the product is complete. The precipitated product is collected on a filter and purified by repeated recrystallization from aqueous methanol and from a mixture of ethyl acetate and cyclohexane. This compound is 4,11β,17α,21-tetrahydroxy-4-pregnene-3,20-dione which has an ultraviolet absorption maximum at about 278 millimicrons with a molecular extinction coefficient of about 12,300. The structural formula is

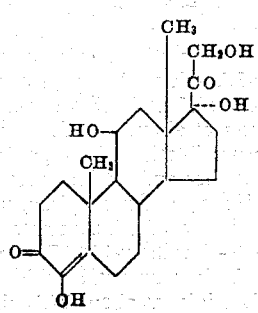

What is claimed is:

1. A member of the class consisting of compounds pounds of the structural formulas

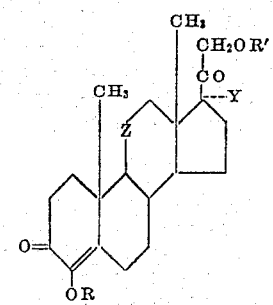

and

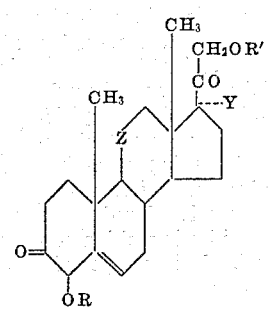

wherein R and R' are members of the class consisting of hydrogen and lower alkanoyl radicals, Y is a member of the class consisting of hydrogen and hydroxyl, and Z is a member of the class consisting of methylene, carbinol, and carbonyl groups.

2. A compound of the structural formula

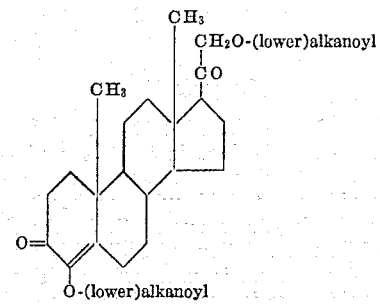

3. 4,21-diacetoxy-4-pregnene-3,20-dione.
4. A compound of the structural formula

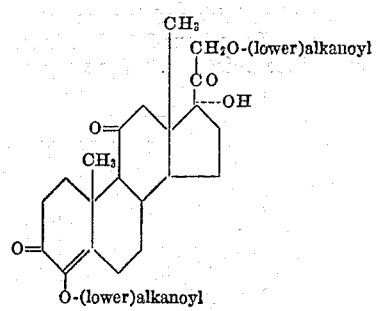

5. 4,21 - diacetoxy - 17α - hydroxy - 4 - pregnene-3,11,20-trione.

6. A compound of the structural formula
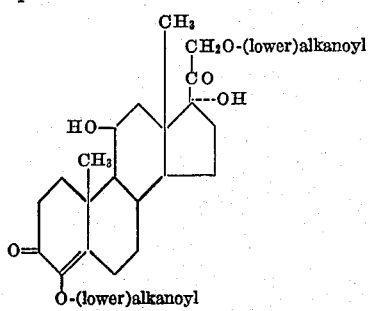
7. 4,21 - diacetoxy - 11β,17α - dihydroxy - 4 - pregnene-3,20-dione.
8. 4,11β,17α,21 - tetrahydroxy - 4 - pregnene - 3,20-dione.
References Cited in the file of this patent
UNITED STATES PATENTS
2,671,096  Murray _____ Mar. 2, 1954